3,070,837
PROCESS AND APPARATUS FOR THE
PREPARATION OF GRANULES
Waldemar Loertscher, Vevey, and Charles Hess, Morges, Switzerland, and Bartolomeo Orsoni and Temistocle Fabris, Milan, Italy, assignors to Montecatini, Societa Generale per l'Industria Mineraria e Chimica, Milan, Italy, a corporation of Italy
Filed Feb. 4, 1958, Ser. No. 713,263
Claims priority, application Italy Feb. 14, 1957
5 Claims. (Cl. 18—2.7)

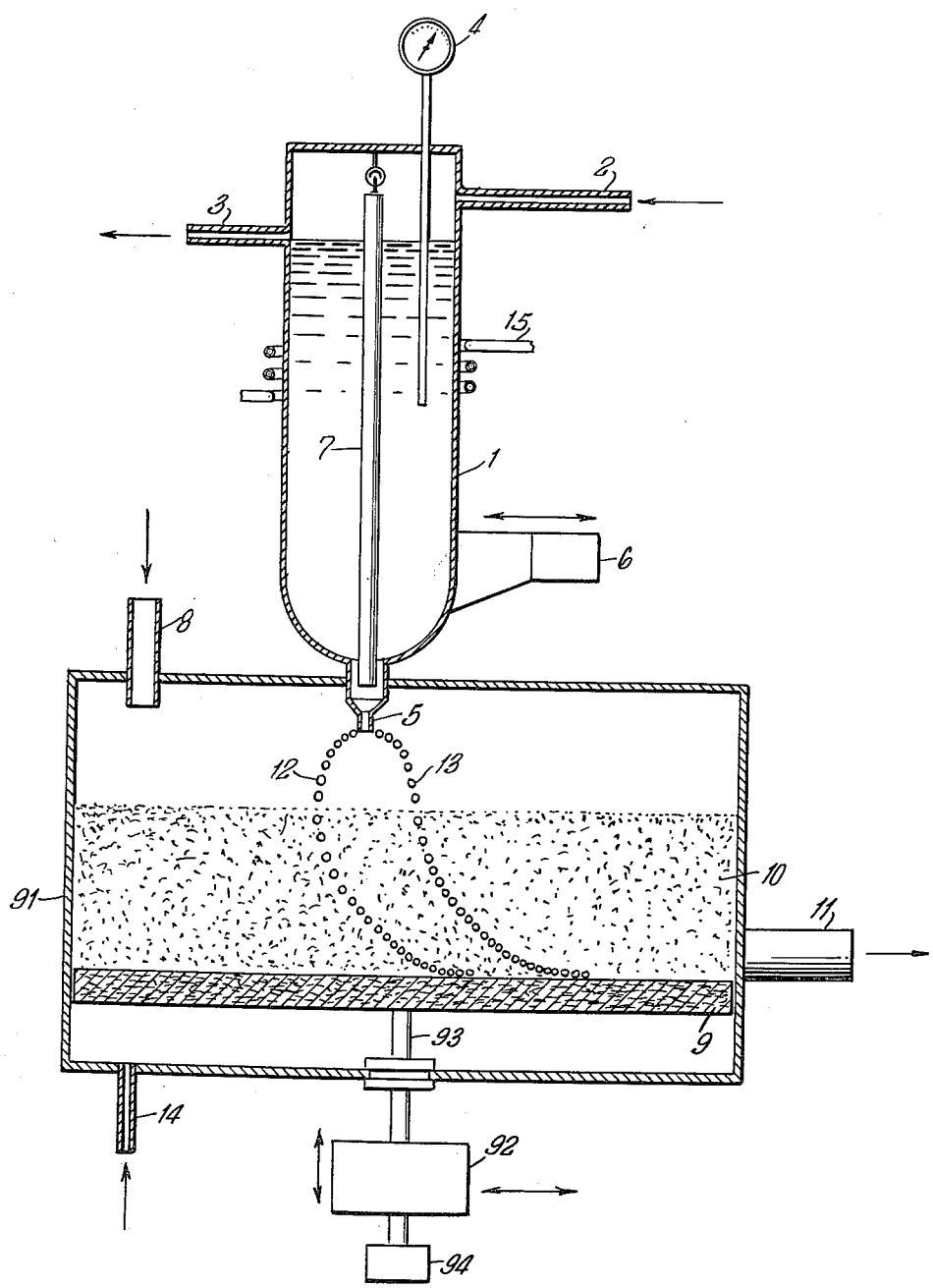

The present invention relates to a process for the preparation of granules of uniform size, coated with a powdery substance, and to an apparatus which makes it possible to carry out such a process. It particularly relates to preparation of coated granules of fertilizer, such as ammonium nitrate with preferably inert materials, such as calcium carbonate and diatomaceous earth, and mixtures thereof.

This invention is obviously applicable to substances other than ammonium nitrate, but which present similar behavior characteristics, as far as concerns the process described hereinbelow.

Various processes are known and employed for the granulation of ammonium nitrate and other substances, generally intended for use as fertilizers. Some of these processes have particular application to ammonium nitrate, urea and other substances which, when containing a moderate water content, a few percent for example, melt at temperatures generally lower than 200° C., at which in any case their decomposition does not occur. One such process comprises first fractioning or subdividing a highly concentrated aqueous solution into drops, at a temperature slightly above the setting point. This solution is pushed, under a pressure of a few or a number of kg./cm.$^2$, through cylindrical holes at the top of a chamber into which an ascending air stream is introduced. During their fall the drops formed by natural fractionation or subdivision in filament forming spouts, solidify into spherical granules.

When it is desired to coat the granules with a powdery substance, the operations are carried out successively, and the amount of powder which normally adheres to the granules, is very low or null, where no adhesive is used.

Because of the rather undetermined or variable system or conditions employed in the formation of the drops, and because of the fact that the fall or descent, during which the drops solidify, occurs from a height of 20 to 30 m., some granules are broken upon touching the chamber bottom. Consequently not all of the granulated product is acceptable, and a portion of it must be rejected, due to a size excess or other defect of the granules, and that portion processed again.

The process of the present invention eliminates the afore-mentioned drawbacks. More particularly, the process makes it possible to employ granulation chambers of very reduced size and to also coat the granules at the same time as the granulation proper, and to obtain granules of very uniform size, finally.

In its preferred form the process of the present invention comprises forming drops of ammonium nitrate by letting the latter flow through vertical nozzles and, at the same time, communicating rhythmical impulses to the pressure of or on the liquid, or imparting vibrations to the nozzles.

In particular, a vibration on the horizontal plane passing through the nozzle hole or outlet orifice has been found to be advantageous. If such vibration has sufficient amplitude it causes the stripping or forming of calibrated drops, and also establishes multiple trajectories thus allowing a higher production capacity for each nozzle. In the case of rectilinear vibrations the trajectories of fall are two.

Said drops are then permitted to fall onto a bed essentially consisting of a suspension in gaseous substances of a powdery substance, preferably that with which the granules are to be coated. This bed is preferably kept in motion, being subjected to one or more transverse, rotatory, vibratory or oscillatory movements or displacements, which all together make possible the continuous renewal of the powdery materials at the points where the drops fall, and the advancement of the finished granules, mixed with the powdery material, toward a discharge outlet.

The drops, having a specific gravity higher than that of the gaseous suspension of powdery material, fall through it thus being cooled and at the same time coated with powder, still maintaining their spherical form. When the thus formed and coated granules reach the bottom of the bed of powdery substance, they are removed by any conventional means, together with a certain amount of loose powdery substance and then separated from this, for instance, by screening.

By this process the height of fall needed for the solidification of the drops is greatly reduced, owing to the relatively low rate of fall, and because of the very quick heat extraction effected by the powdery substance in contact with the drops.

Also, the horizontal dimensions of the space needed for a given output capacity are much reduced. This is due to the fact that the distance between the drops can be reduced to a minimum value, either because the trajectories of fall are clearly defined in the space and the drops fall along them at a definite distance, one from the other, or as a consequence of the fact that, even when the drops come into a slight contact, their mutual adhesion is avoided by the presence of the powder which is kept in a continuous movement and thus separates the drops.

The suspension of the powdery substance can be obtained by various means. For example, a strong, ascending current of the suspension can be recirculated inside or to and from the vessel. Or one can employ mechanical vibration at high or very high frequencies. However, for materials of the type of molten ammonium nitrate, it is very advantageous to allow the molten drops to fall down through a gas-fluidized bed. Namely—fluidification is used, that is, relatively low or controlled amounts of gas such as air are blown through a porous bottom which is below the bed or mass of powdery substance, and which supports the latter when the gas is cut off.

The granules obtained by the process of the present invention are of very uniform size, as it will appear from the data set forth below.

By the process of this invention it is feasible to suspend in the molten nitrate amounts of other very finely divided substances, such as other fertilizers or assistants, which can remain incorporated in the granules.

The process of the present invention can be suitably and advantageously carried out by an apparatus which may essentially comprise:

(a) A vessel which contains a constant and regulatable amount of molten ammonium nitrate for example, and carries, on its lower part, outlet nozzles having a mouth provided with sharp corners or edges;

(b) An electromagnetic vibrator which applies to the preceding apparatus complex vibrations having large or major components of direction in the plane of the outlet hole of the nozzles;

(c) A support for powdery material, placed under said nozzles;

(d) Means to keep in suspension the powdery material initially placed on a support, and means to move said support, in order to carry out, at the same time, the continuous renewal of the powdery materials under the nozzles and the advancement of the granules already formed towards a suitable discharge outlet;

(e) Means to maintain the molten ammonium nitrate contained in vessel a in slight agitation; and (f) Means to heat the apparatus complex described in a.

The accompanying drawing illustrates schematically a preferred embodiment of the invention.

In the drawing, vessel 1 contains molten ammonium nitrate, for example, which is maintained in the fluid state by heating means, 2 is a pipe for the continuous feeding of ammonium nitrate, 3 is an overflow pipe which makes it possible to assure a constant level in the vessel, 4 is a device for temperature control, 5 is a nozzle for the outlet of molten nitrate, 6 is an electromagnetic vibrator which imparts horizontal vibrations to the vessel and thereby to the nozzle, 7 is a vibrating rod immersed in the molten ammonium nitrate, above the nozzle, the upper end of said rod being supported by a point or pivot rigidly connected with vessel 1, 8 is an inlet mouth for charging the powdery substance intended to constitute the suspension bed, 9 is an air-permeable receiving plate for the granules coated with the powdery substance 10, and 11 is an outlet toward and through which the granulated product mixed with the powdery substance discharges. A heating coil is shown at 15 and an air inlet at 14. It is understood that the air introduced at 14 can be removed at 16, for example, and recirculated.

Vibrating rod 7 serves to keep the molten salt in a moderate agitation thus preventing local solidification even when the average temperature is very near the solidification temperature.

Plate 9 preferably, but not necessarily, slants downwardly at the right, in order to facilitate the flowing of the suspended substance and of the granules towards the discharging outlet. Plate 9 is porous to permit access of air introduced below, at 14. Plate 9 can be movably mounted on a universal joint or pivot rod 93 movably supported at 94, so that it can be moved or vibrated upwardly and downwardly and transversely by oscillator 92, in all directions. Or lower vessel 91 can vibrate as a whole, conjointly with upper vessel 1.

From said drawing it is clear that the horizontal vibration communicated to the nozzle produces at least two different trajectories 12 and 13, for fall of the drops as explained above.

The distance between the nozzle hole and the surface of the fluidized or suspended bed should be sufficiently high so as to make it possible that, owing to the acceleration, a sufficient increment of distance occurs between two successive drops falling along the same trajectory and also that the same drops can gain a sufficient, but not excessive, vertical speed before entering the suspension of powdery substance.

It has been experimentally determined that the drop size and the size range covered by them are governed by the diameter of the nozzle, the pressure of the liquid at the nozzle, the amplitude of the vibration, and the concentration and temperature of the liquid. When these elements are constant the drop size is very uniform. The narrowness of the size range is favorably influenced by broad amplitude of vibration; i.e., by high values of acceleration when the other conditions remain the same.

In the following tables the data obtained from tests carried out under various conditions are shown. They have been carried out with 93% ammonium nitrate (remainder chiefly water) kept in the molten state at $130 \pm 3°$ C.

TABLE 1

| Nozzle diameter, mm. | Height of the liquid column, mm. | Drops diameter | |
|---|---|---|---|
| | | Without vibration | With 50 vibrations per second, amplitude 0.5 mm. |
| 1.4 | 50 | 3 | 1-2 |
| 1.4 | 200 | 2 | 0.5 |
| 3 | 200 | 5 | 3 |

TABLE 2

| Nozzle diameter, mm. | Liquid column height, mm. | 50 vibrations per second, amplitude, mm. | Percentage by weight of the drops formed | | | | |
|---|---|---|---|---|---|---|---|
| | | | Diameter above 3.3 mm., percent | Diameter between 3.3 and 2.3 mm., percent | Diameter between 2.3 and 2 mm., percent | Diameter between 2 and 0.85 mm. percent | Diameter below 0.85 mm., percent |
| 1.4 | 200 | 0.25-0.30 | 3.6 | 48.0 | 45.5 | 2.9 | 0.0 |
| 1.4 | 200 | 0.3-0.4 | 1.0 | 56.0 | 40.5 | 2.5 | 0.0 |
| 1.4 | 200 | 0.4-0.5 | 0.0 | 52.5 | 44.0 | 3.5 | 0.0 |
| 1.4 | 200 | 0.5-0.6 | 0.0 | 18.3 | 81.0 | 0.7 | 0.0 |

TABLE 3

| Nozzle diameter, mm. | Liquid column height, mm. | Amplitude of the vibrations (50 per sec.) mm. | Minimum falling height required, cm. |
|---|---|---|---|
| 1.4 | 200 | 0.0 | 50-55 |
| 1.4 | 200 | 0.2 | 40 |
| 1.4 | 200 | 0.25 | 40 |
| 1.4 | 200 | 0.3 | 35 |
| 1.4 | 200 | 0.4 | 30 |
| 1.4 | 200 | 0.5 | 20 |
| 1.4 | 200 | 0.6 | 5-10 |
| 1.4 | 50 | 0.0 | 30 |
| 1.4 | 50 | 0.6 | 10 |
| 3 | 200 | 0.0 | 240 |
| 3 | 200 | 0.6 | 100 |

[1] Fractionating at the nozzle outlet.

In the following table the data obtained from tests carried out with 95–97% ammonium nitrate kept at $135 \pm 3°$ C. are shown.

To the nozzle, having a 1 mm. diameter, 50 vibrations per second have been applied, with an amplitude of 0.2, 0.4 and 0.6 mm., respectively.

TABLE 4

| Diameter of the drops | Percent distribution by weight | | |
|---|---|---|---|
| | Test 1, percent | Test 2, percent | Test 3, percent |
| Above 3.3 mm | 2 | 10.5 | 1 |
| 3.3–2.3 mm | 13 | 10 | 40 |
| 2.3–2.0 mm | 74 | 74 | 57 |
| 2.0–0.85 mm | 11 | 4 | 2 |
| 0.85–0.5 mm | 0 | 1.5 | 0 |

The afore-mentioned data show the possibilty of obtaining granules within a very narrow range of size. The following example serves to illustrate the present invention without limiting the same.

EXAMPLE

With an apparatus such as that described before, 93% ammonium nitrate (remainder chiefly water), kept liquid at 130°±3° C., is granulated, using a 1.4 mm. nozzle subjected to 50 vibrations per second with an amplitude of 0.5 mm. As powdery substance ground calc spar (calcite), about 75% of which passes through a square mesh sieve with a light of 0.21 mm., is used.

The depth of the calc spar bed 10 is about 40 mm. at rest, and about 70 mm. when it is fluidized by air. About 100 drops per second, with a diameter comprising between 2.0 and 3.3 mm., corresponding to about 3.6 kg. of finished product per hour, are obtained. The nitrogen content of the finished product is of about 25–30% (pure ammonium nitrate content of 35%) and the thickness of the calc spar coating is of 0.10–0.15 mm.

The granules obtained do not agglomerate even after prolonged storage under pressure and in the presence of a certain moisture amount and are therefore perfectly suitable as fertilizers.

The electromagnetic vibrator device 6 may be of a known and conventional type. The vessel 1 can be spring-mounted by the outer casing of the vibrator device, and the electromagnetic vibrator or striker element caused to shake, or to strike, the side of the vessel.

The process is obviously applicable to other molten materials, preferably those melting at moderate temperatures.

The powdery substance introduced at 8 may comprise ammonium nitrate, preferably in part only, and admixed with calcium carbonate and a diatomaceous earth.

It is understood that the inventors intend to claim as a part of their invention, any variations, substitutions and changes that lie within the scope of the invention and the hereinatfer appended claims and intend to include within the scope of said claims such changes as may be apparent to those skilled in the art in the practice of the principles of this invention, and within the scope as set forth in the hereinabove stated specification.

We claim:

1. Apparatus for the preparation, starting from molten ammonium nitrate, of granules thereof having practically uniform size, coated with powdery material, said apparatus comprising a vessel for containing constant amounts of molten ammonium nitrate, at least one outlet nozzle for the molten ammonium nitrate provided with sharp edges and connected to said vessel, means for imparting to the nozzle a quick vibratory movement whose components or component lie at least chiefly in the plane of the outlet orifice of the nozzle, means for containing a mass of powdery material below said nozzle, a gas-porous plate for receiving the coated granules and situated below said mass, and means below said plate to introduce gas therethrough to keep said powdery material in fluidized state, means forming a gas outlet above said plate, means forming an intake above said plate for introducing the powdery material, and means for vibrating said vessel and for moving the plate in a direction longitudinal to the upper surface thereof.

2. A process for the preparation of ammonium nitrate granules coated with a powdery material, comprising transforming molten ammonium nitrate into drops by passing it through an orifice and allowing said drops to fall, in at least semifluid state, into a cooling bed, said bed being a gas-fluidized mass of powdery material comprosing a mixture of gas, calcium carbonate and solidified ammonium nitrate particles, fluidized solely by blowing in said gas at a rate, hindering the powdery material from settling, the drops, as they are being formed and permitted to fall, being subjected to respective differential displacement laterally of the direction of fall, to provide different paths of fall for respective sequentially forming drops, the bed being simultaneously vibrated in a direction transverse to the direction of fall.

3. In a process for preparation of granules from nitrogenous, fertilizer crystallizable molten compound-forming material, in which the molten material is transformed into falling molten drops and solidified into granules as it falls, the improvement comprising subjecting the drops, as they are being formed and permitted to fall, to respective differential displacement laterally of the direction of fall, to provide different paths of fall for respective sequentially forming drops, said drops being allowed to fall downwardly, in at least semifluid state, into a cooling bed, said bed being a mass of powdery material which is maintained in fluidized state solely by gas blown in a rate hindering the powdery material of the bed from settling, the bed being simultaneously vibrated in a direction transverse to the direction of fall.

4. A process for the preparation of granules coated with a powdery material, from a molten nitrogenous crystallizable fertilizer substance, comprising forming said molten substance into molten drops, solidifying the drops by introducing them into a cooling bed comprising a mass of the powdery material which coats the granules, said bed being fluidized solely by blowing gas thereinto at a rate hindering the powdery material from settling, the drops falling downwardly into the bed, the bed being simultaneously vibrated in a direction transverse to the direction of fall.

5. A process for the preparation of ammonium nitrate granules of a practically uniform size, coated with a powdery material, comprising transforming molten ammonium nitrate into drops by passing it under pressure governed by a controlled static liquid head through an orifice, the major amount of the total weight of the drops being constituted of drops having a diameter which is not less than about two millimeters, and allowing said drops, in at least semifluid state, to fall into a cooling bed below, comprising a mass forming a gas-fluidized bed of the powdery material destined to coat the granules, the orifice being given a vibratory movement at least whose major components or component lie in the plane of the orifice, the bed being simultaneously vibrated in a direction transverse to the direction of fall, the bed being fluidized solely by blowing gas through it at a rate sufficient to keep the powdery material in suspension.

References Cited in the file of this patent

UNITED STATES PATENTS

| 857,756 | Reddy | June 25, 1907 |
| 1,627,863 | O'Neil | May 10, 1927 |
| 1,782,038 | Haak | Nov. 18, 1930 |
| 2,059,983 | Dent et al. | Nov. 3, 1936 |
| 2,269,528 | Gallup | Jan. 13, 1942 |
| 2,484,792 | Mollring | Oct. 11, 1949 |
| 2,510,574 | Greenhalgn | June 6, 1950 |
| 2,511,088 | Whaley | June 13, 1950 |
| 2,528,407 | Yeandle | Oct. 31, 1950 |
| 2,544,678 | Hancox et al. | Mar. 13, 1951 |
| 2,562,149 | Mollring | July 24, 1951 |
| 2,600,253 | Lutz | June 10, 1952 |
| 2,644,769 | Robinson | July 7, 1953 |
| 2,714,224 | Schaub | Aug. 2, 1955 |
| 2,887,723 | Hallie et al. | May 26, 1959 |
| 2,938,233 | Nack et al. | May 31, 1960 |